Oct. 22, 1968  R. J. CURRAN  3,406,798
OVERRUNNING CLUTCH WITH AUTOMATIC RELEASE
Filed Feb. 9, 1967  4 Sheets-Sheet 2

Oct. 22, 1968  R. J. CURRAN  3,406,798
OVERRUNNING CLUTCH WITH AUTOMATIC RELEASE
Filed Feb. 3, 1967  4 Sheets-Sheet 3

United States Patent Office  3,406,798
Patented Oct. 22, 1968

3,406,798
OVERRUNNING CLUTCH WITH
AUTOMATIC RELEASE
Robert J. Curran, Elmhurst, Ill., assignor to Borg-Warner
Corporation, Chicago, Ill., a corporation of Illinois
Filed Feb. 9, 1967, Ser. No. 614,840
5 Claims. (Cl. 192—35)

ABSTRACT OF THE DISCLOSURE

An automatic freewheeling roller clutch having rotary input and output members, including a ratchet and pawl device connected between a nonrotatable member and the rollers for releasing the rollers when the output member rotates in the backdriving direction, one embodiment providing for driving in one direction and freewheeling in either direction, another embodiment providing for driving in either direction and freewheeling in either direction.

Background of the invention

The field of invention pertains to power transmitting devices operating by frictional interlocking for securing driving continuity between a driving and driven part which engages without manipulation upon initiation of rotation of the driving part and releases without manipulation upon overdriving by the driven part in either direction.

The prior art includes one-way overrunning clutches in which the driven member is permitted to overrun the driving member in the driving direction but not in the backdriving direction; also included in the prior art are reversible one-way overrunning clutches which can be conditioned for operation in either direction, however, once conditioned for operation in a given driving direction, overrunning by the driven member, in the backdriving direction, is prevented.

The present invention provides for independent rotation of the driven member in either driving or back-driving direction of rotation in either one-way overrunning clutches or in reversible one-way overrunning clutches.

Summary

The present invention relates generally to clutches of the overrunning type and more particularly to provision for overrunning of the driven member in either the driving or backdriving direction of rotation.

Overrunning clutches according to the prior art, ordinarily provide for driving an output member in one direction of rotation while permitting output member to overrun the input member in the same or driving direction but prohibiting reverse or backdriving rotation of the output member. Such prior clutches are satisfactory for a wide range of applications but are subject to criticism when used for coupling power to auxiliary driving wheels of a vehicle.

For example, assume that a land vehicle is ordinarily driven in forward or reverse direction by a pair of drive wheels and is provided with other supporting wheels to which auxiliary power can be supplied on occasion as for providing aditional tractive effort. In such a case the power transmission apparatus generally provides a range of high and low operating speeds for the drive wheels but may provide only a low speed operating range for the auxiliary wheels. When such a vehicle has been moving in the forward direction at low speed, making use of the auxiliary tractive effort, and then continues in the forward direction at a higher speed, the prior type overrunning clutch would permit the auxiliary wheel to travel at the speed of the vehicle thereby overrunning the auxiliary power transmission in the driving direction. If, however, the vehicle is reversed in direction, the auxiliary wheels backdrive the auxiliary power transmission in reverse direction, and if the vehicle then increases velocity in the reverse direction the auxiliary power unit may be damaged by excessive rotational velocity, since it is essentially a low speed apparatus.

The clutch according to the present invention provides for overrunning of the output member in the driving direction and also provides for decoupling or release of the clutch members when the output member is rotated in the backdriving direction. Thus such a clutch, installed between an auxiliary power transmission and auxiliary driving wheels of a vehicle, permits the auxiliary wheels to rotate in either direction responsive to movement of the vehicle without backdriving the auxiliary power transmission.

It is therefore an object of the present invention to provide a clutch in which the driven or output member is permitted to rotate in either direction independently of the driving or input member.

Other objects and advantages of the present invention will become apparent from a consideration of the following description together with the drawings.

Description of the preferred embodiments

Figure 1:
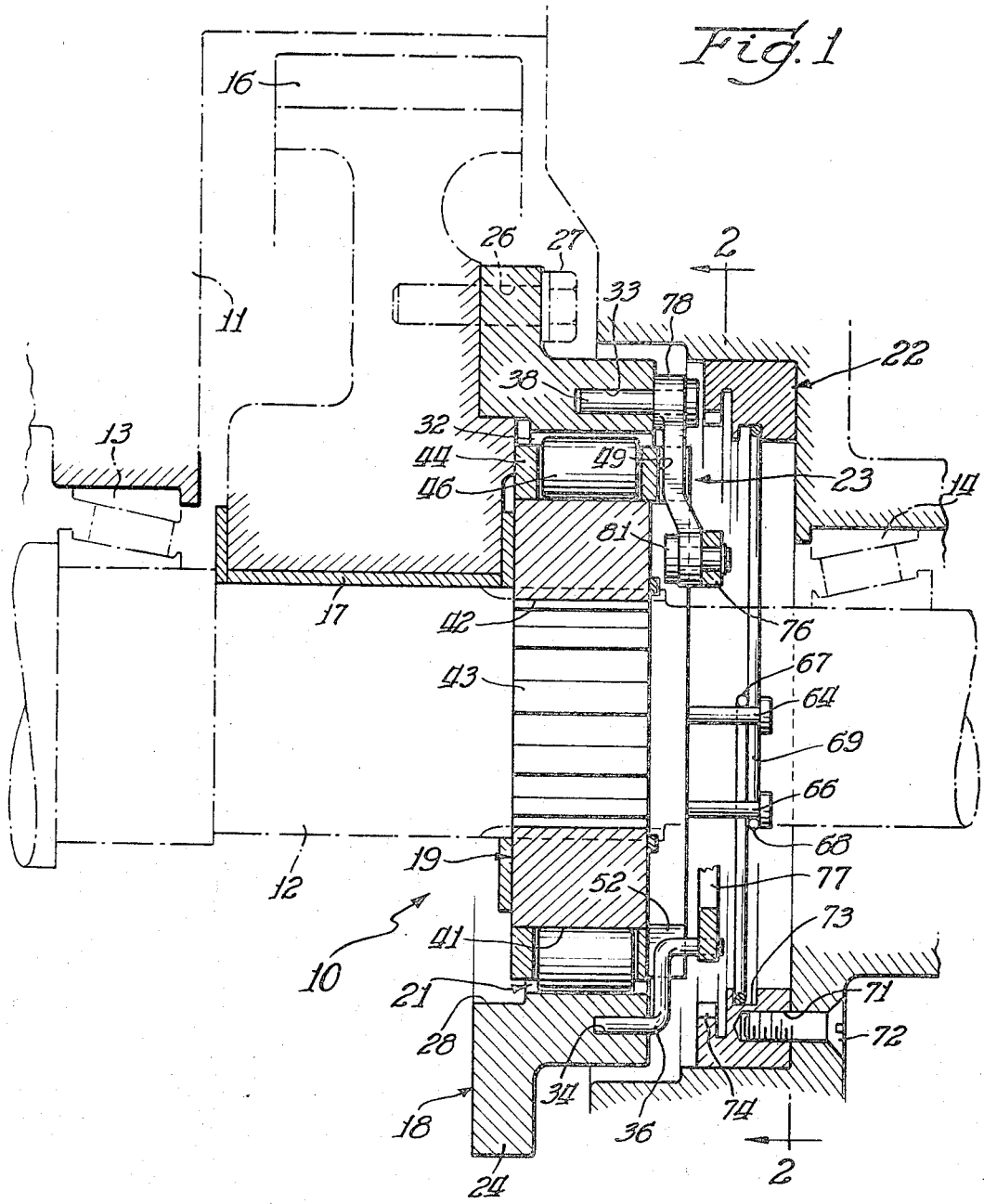
FIGURE 1 is an elevation view, in section, showing the clutch according to the present invention in association with portions of a power transmission apparatus.
Figure 2:
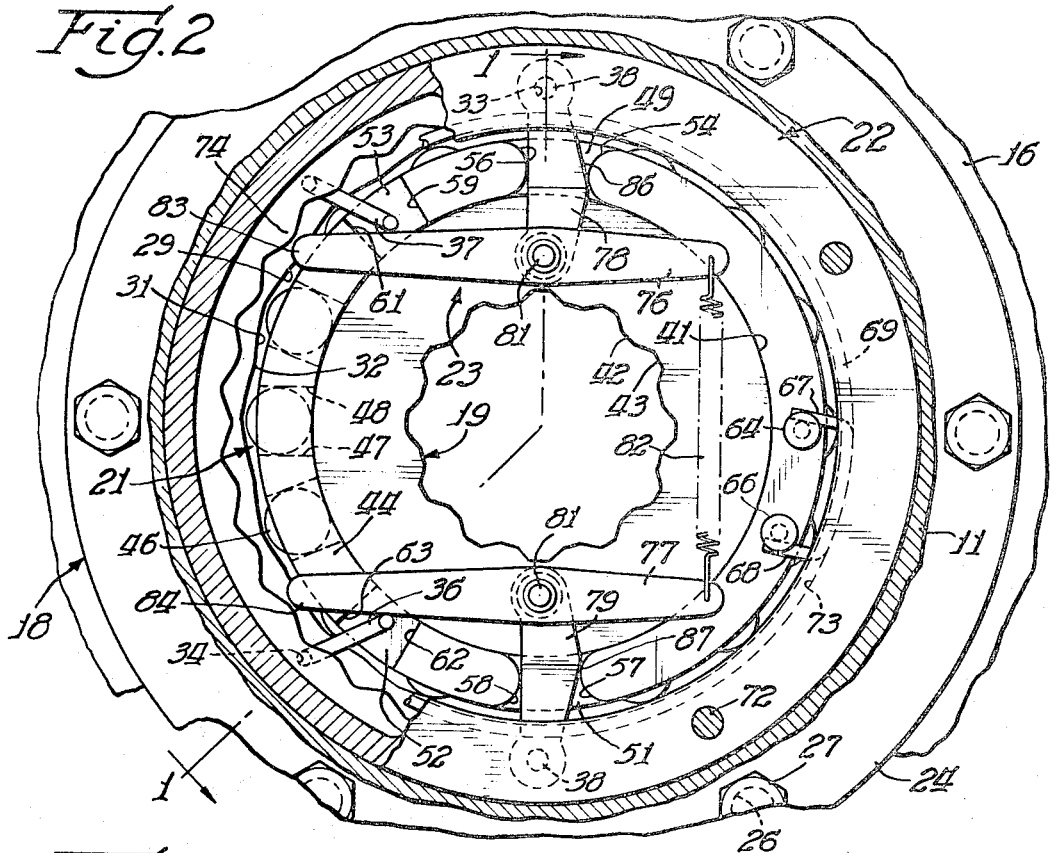
FIGURE 2 is a view taken along the line 2—2 of FIGURE 1 with portions broken away to reveal the internal construction thereof.

Referring now in more detail to the drawings and particularly FIGURES 1 and 2 thereof, the reference character 10 generally indicates a freewheeling clutch according to the present invention. Portions of a machine frame 11 are shown in broken lines representing, for example, a vehicle body. A shaft 12 is supported for rotation in frame 11 by bearings 13 and 14 and may be connected to a ground engaging auxiliary traction wheel not shown in the drawings. A drive gear 16 is journalled for rotation on shaft 12 by bearing 17 and forms a portion of an auxiliary power transmission unit not shown in the drawings for furnishing power to the ground engaging auxiliary traction wheel.

The freewheeling clutch 10 includes a rotatable driving or input member 18, a rotatable driven or output member 19, shiftable wedging apparatus 21, a nonrotatable frame member 22, and the overrunning coupling device 23, each of which will be discussed more fully hereinafter.

Driving or input member 18 includes flange 24 provided with a pattern of mounting apertures 26 for receiving cap screws 27. A recess is formed by the surface 28 inwardly of flange 24 to provide for concentric alignment of input member 18 with driving gear 16. Cap screws 27 provide for securing input member 18 to gear 16. As shown more clearly in FIGURE 2, the inner surface of input member 18 is formed by pairs of inclined ramps 29, 31 substantially filling the inner periphery thereof to provide a cammed clutch race 32. Input member 18 is also provided with mounting sockets 33 and 34 for receiving abutments 36, 37 and mounting pins 38.

Driven or output member 19 is provided with a smooth outer race 41. The inner surface 42 of output member 19 is provided with a complement of splines 43 for engagement with a splined portion of shaft 12.

Shiftable wedging apparatus 21 includes cage 44 and a series of rollers 46 arranged and spaced to coincide with the pairs of ramps 29, 31 of input member 18. Cage 44 is provided with internal walls 47, 48 for retaining rollers 46 in the desired circumferential spacing. Cage 44 is also provided with external slots 49 and 51 defined by curved wall portions 54, 56 and 57, 58, and with slots 52 and 53 defined by straight wall portions 59, 61 and 62, 63. Slots 52, 53 provide working clearance between cage 44 and abutments 36 and 37 permitting shifting of cage 44 and rollers 46 with respect to input member 18 on which the stops or abutments 36, 37 are mounted. Slots 49 and 51, with their associated curved wall portions 54, 56, 57, 58, embrace portions of the overrunning coupling device 23 providing for shifting of wedging apparatus 21 with respect to input member 18 for either driving or free-wheeling modes of operation. Cage 44 is also provided with a pair of pins 64, 66 extending axially therefrom for engagement with end portions 67, 68 of drag link 69.

Nonrotatable frame member 22 is provided with a series of threaded apertures 71 for cap screws 72 effective to nonrotatably secure member 22 to machine frame 11. Nonrotatable member 22 includes a frictional race surface 73 against which drag link 69 bears. A ring of ratchet teeth 74 is formed internally of member 22 spaced axially from friction race 73.

Overrunning coupling device 23 includes pairs of pawls 76, 77 and pairs of pawl lever arms 78, 79. Pawl lever arm 78 is pivotally mounted on input member 18 by means of one of the mounting pins 38. Pawl 76 is pivotally mounted on pawl lever arm 78 by pin 81. Pawl lever arm 79 is similarly mounted on input member 18 by means of another of pins 38, and pawl 77 is pivotally connected to lever arm 79 by another of the pins 81. Each of lever arms 78 and 79 is offset in the axial direction of the clutch assembly, one being the opposite hand of the other. The pairs of pawls 76, 77 and lever arms 78, 79 are mounted back to back and interconnected by biasing spring 82. When clutch 10 is in neutral or freewheeling condition as shown in FIGURE 2, pawls 76, 77 are urged against respective abutments 37, 36 by spring 82 to form a symmetrical array in which the end portions 83, 84 of pawls 76, 77 are in a position of clearance with respect to the ring of ratchet teeth.

Rotational movement of input member 18 with respect to cage 44 results in the movement of pawls 76 and 77 into an assymetrical relationship in which one pawl is engaged with the ring of ratchet teeth 74 while the other is withdrawn therefrom. For example, clockwise movement of input member 18 carries abutment 36 into engagement with pawl 77 pivoting end portion 84 thereof about pin 81 in a direction away from ratchet teeth 74 and tending to tension spring 82. At the same time abutment 37 is moving away from pawl 76 permitting end portion 83 thereof to pivot into engagement with ratchet teeth 74 under the urgence of spring 82.

Counterclockwise rotation of input member 18 functions in the opposite sense, abutment 37 moving pawl 76 away from engagement with the ratchet teeth 74 while abutment 36 is moving away from pawl 77 to permit engagement thereof with the ratchet teeth. The midposition shown in FIGURE 2 is the neutral condition of the clutch in which both pawls are simultaneously out of contact with ratchet teeth 74.

Operation

Figure 3:
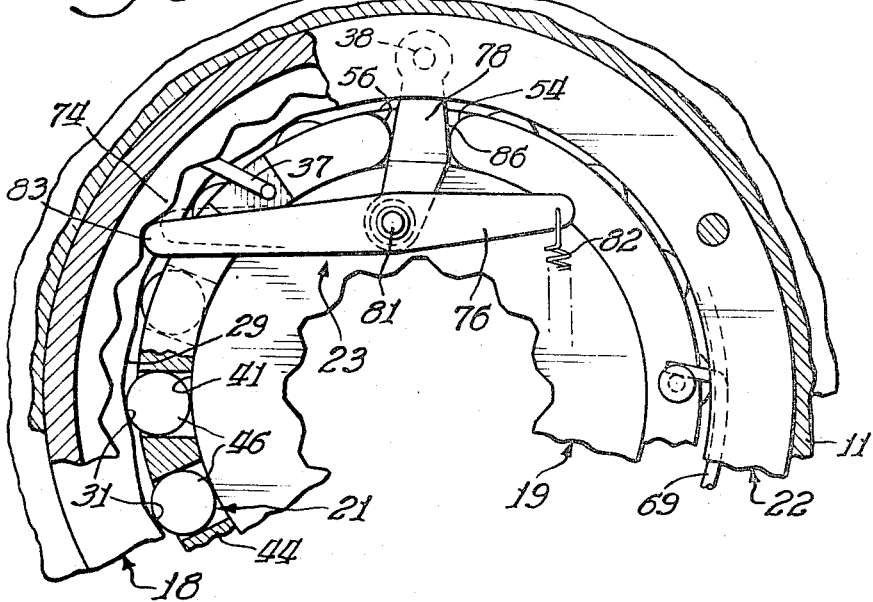
FIGURE 3 is a fragmentary view similar to FIGURE 2 showing portions of the clutch conditioned for driving in the clockwise direction of rotation.
Figure 4:
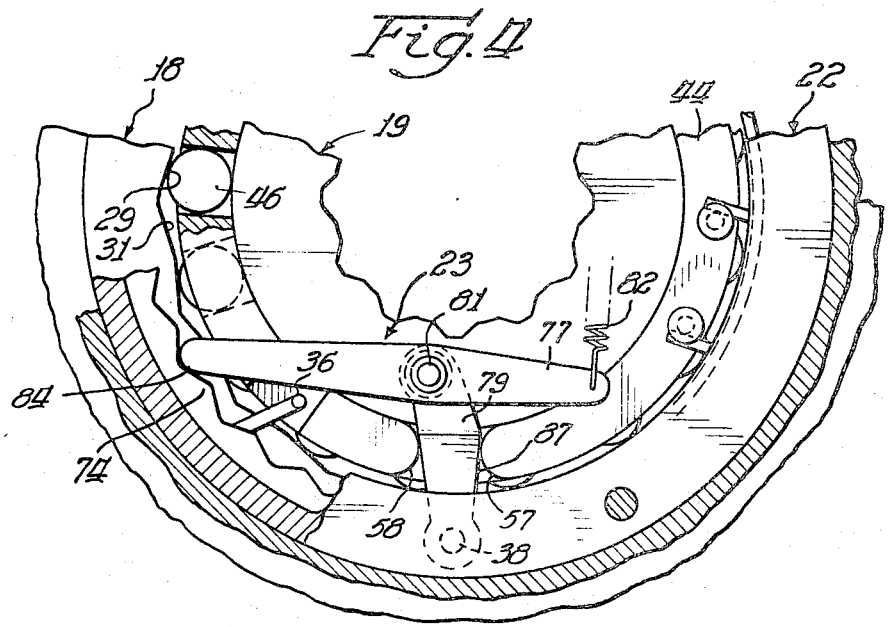
FIGURE 4 is a fragmentary view similar to FIGURE 2 showing portions of the clutch conditioned for driving in the counterclockwise direction of rotation.

The form of freewheeling clutch shown in FIGURE 2 is capable of driving the output member in either the clockwise or counterclockwise direction of rotation and of allowing freewheeling of the output member in either direction as will be more readily understood from inspection of FIGURES 2 through 4. As shown in FIGURE 2, the clutch is in neutral condition permitting output member 19 to rotate freely in either direction independently of the other portions of the clutch. In this neutral or disengaged condition, input member 18 is at rest and wedging apparatus 21 is also at rest, cage 44 being frictionally grounded to nonrotatable member 22 through drag link 69. In this condition, rollers 46 are positioned midway between ramps 29 and 31 such that the rollers can not simultaneously engage the ramps of input member 18 and the outer race surface 41 of output member 19. In this condition, output member 19 can rotate in either clockwise or counterclockwise direction without affecting input member 18. Those rollers 46 which are in contact with race surface 41 will tend to spin within the confines of walls 47, 48 in cage 44. Those rollers which are in contact with the ramps of input member 18 will remain at rest since both the input member and cage are at rest.

In FIGURE 3, clutch 10 is shown conditioned for driving in the clockwise direction. As will be explained more fully hereinafter the driven or output member 19 is conditioned to be driven by the input member 18 in the clockwise or driving direction at the speed of the input member and the overrun or freewheel in the driving direction at speeds above that of the input member. The clutch is also conditioned for freewheeling rotation in the counterclockwise direction responsive to initial rotation of output member 19 in the backdriving direction.

As shown in FIGURE 3, input member 18 has been rotated slightly in the clockwise or driving direction while cage 44 has remained stationary because of its frictional drag on nonrotatable member 22 through drag link 69. This slight movement of input member 18 in the driving direction effectively wedges rollers 46 between ramps 31 and race 41 thereby clamping input member 18 and output member 19 together for unitary rotation in the driving direction.

This slight movement of input member 18 in the driving direction relative to rollers 46 results in a slight pivotal movement of pawl arms 78, 79 such that end portion 84 of pawl 77 is moved away from the ring of ratchet teeth 74 while end portion 83 of pawl 76 is moved into engagement therewith. Abutment 37 is rotated away from pawl 76 while abutment 36 is moved against pawl 77 swinging it about pin 81 to move end 84 further from the ring of ratchet teeth. When the clutch is being driven in the clockwise direction, the end portion 83 of pawl 76 rides on the ring of ratchet teeth 74 while pawl 77 is entirely disengaged therefrom.

If output member 19 should rotate more rapidly than input member 18 in the driving direction, rollers 46 move in the driving direction away from ramps 31 thereby releasing the wedging action to permit freewheeling of output member 19 in the driving direction. The retarding action of member 69 prevents the rollers from moving into contact with ramps 29.

If output member 19 should rotate in the counterclockwise or backdriving direction (as distinguished from resisting rotation in the driving direction) the wedging engagement of rollers 46 between ramps 31 and race 41 results in an initial movement of input member 18 in the backdriving direction. However pawl 76 is engaged with the ring of ratchet teeth 74 such that backdriving rotation of the pawl is prevented. In this backdriving condition pin 81 of lever arm 78 is prevented from rotating in the backdriving direction by pawl 76 while pin 38 is moved in the backdriving direction by input member 18. This combination of motions results in the rotation of pin 38 of lever 78 in the backdriving direction at a rotational velocity equal to that of the clutch while midportion 86 thereof travels more slowly than the curved wall portion 54 of cage 44. Cage 44 and rollers 46 are thus caused to lag behind the ramps 31 of input member 18 until the wedging action is released which permits freewheeling of output member 19 in the backdriving direction of rotation.

Another way of visualizing the interaction of lever 78 with cage 44 is to assume that the clutch members remain stationary while frame member 22 rotates in the opposite direction. In either case, it can readily be appeciated that when lever arm 78 pivots counterclockwise about pin 38, a prying action is exerted between input member 18 and cage 44 in the disengaging direction. It can also be appreciated that lever 78 is required to pivot counterclockwise about pin 38 when input member 18 rotates in the backdriving direction while pawl 76 is engaged with the nonrotating ring of ratchet teeth 74. Lever 78 thus functions as a pry bar for multipling the disengaging force exerted on the cage by the pawl.

Whereas FIGURE 3 illustrates the operation of the upper portion of the overrunning coupling device which is effective when the clutch is driving in the clockwise direction, FIGURE 4 illustrates the operation of the lower portion thereof which is effective when the clutch is driving in the counterclockwise direction.

As shown in FIGURE 4, input member 18 has been driven in the counterclockwise direction so that rollers 46 are in contact with ramps 29. Curved wall 57 of cage 44 bears against midportion 87 of lever arm 79 tilting it about pin 38 to place end 84 of pawl 77 in contact with the ring of ratchet teeth 74. Further rotation of input member 18 in the counterclockwise direction results in driving output member 19 in the counterclockwise or driving direction while pawl 77 rides over ratchet teeth 74.

If output member 19 should begin to rotate in the backdriving or clockwise direction, pawl 77 bearing against ratchet teeth 74 becomes effective to shift cage 44 and rollers 46 to the neutral or released condition as shown in FIGURE 2.

Thus the above described embodiment of the invention provides a clutch capable of driving a member such as a road wheel of a vehicle in either the clockwise or counterclockwise direction of rotation while also permitting the driven member to freewheel in either direction of rotation without resorting to external shifting apparatus.

*Description of alternate embodiments*

Figure 5:
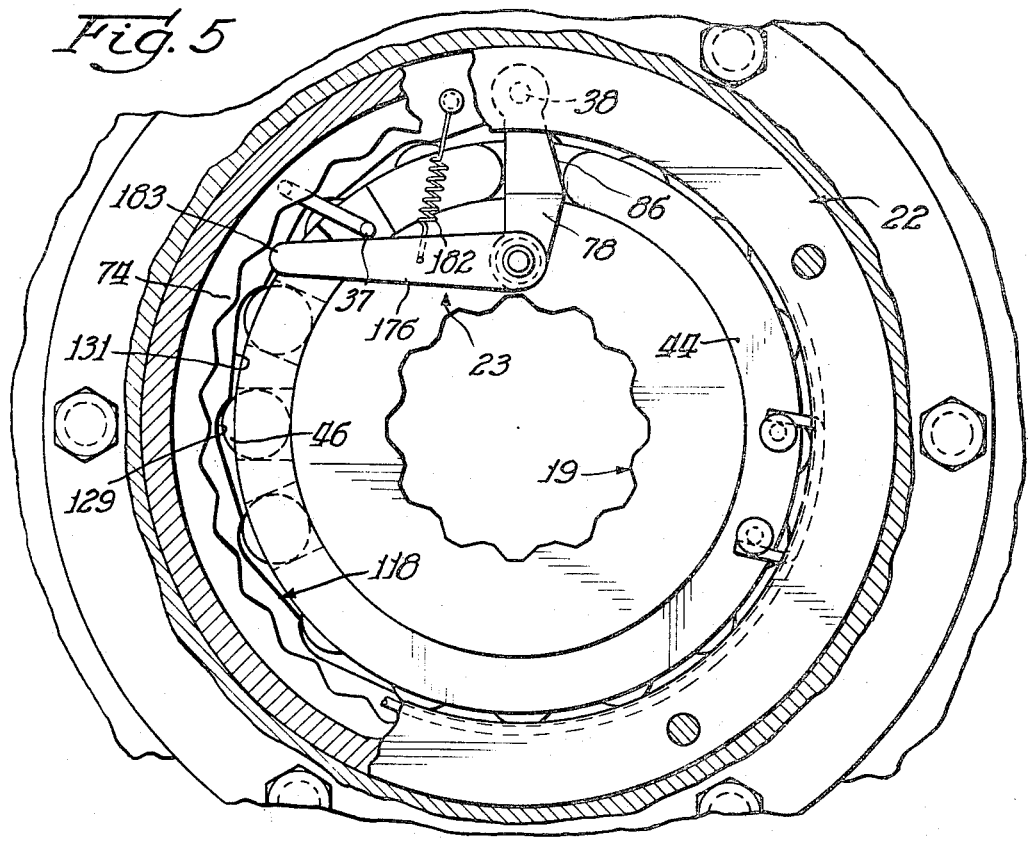
FIGURE 5 is a view of an alternate embodiment of the clutch in neutral condition.
Figure 6:
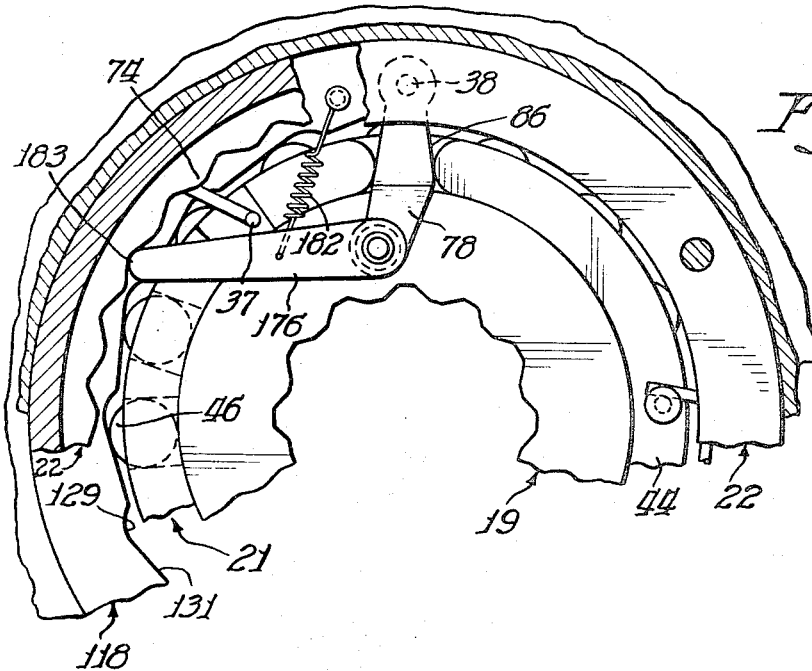
FIGURE 6 is a view of the alternate embodiment of FIGURE 5 showing portions of the clutch shifted to position for driving in the clockwise direction of rotation.

FIGURES 5 and 6 illustrate another form of clutch in which input member 118 and pawl 176 have been modified to provide for driving in one direction only. The ramps have been modified to provide a driving ramp 131 while ramp 129 serves as a shoulder for roller 46 in the neutral or released condition. Inasmuch as only one direction of driving is contemplated for the embodiment of FIGURE 5, only one pawl 176 and one pawl lever arm are required. Pawl 176 is urged in the direction to engage ratchet teeth 74 by spring 182 connected to input member 118. Abutment 37 is effective to disengage pawl 176 from ratchet teeth 74 to permit rotation of input member 118 in the counterclockwise direction.

As shown in FIGURE 6, clockwise rotation of input member 118 results in shifting end 183 of pawl 176 into engagement with the ring of ratchet teeth 74. As explained in connection with the FIGURE 2 embodiment, output member 19 is effective to disengage rollers 46 from ramps 131 upon rotation thereof in the backdriving direction. As before, pawl 176 pivots lever arm 78 about pin 38 resulting in a prying action between cage 44 and input member 118. Overrunning rotation of output member 19 in the driving direction moves rollers 46 from driving ramps 131 to the shoulder 129 thereby freeing the members for independent rotation. Output member 19 is thus able to freewheel in the direction of rotation while input member 118 can drive in the clockwise direction of freewheel in the counterclockwise direction.

Figure 7:
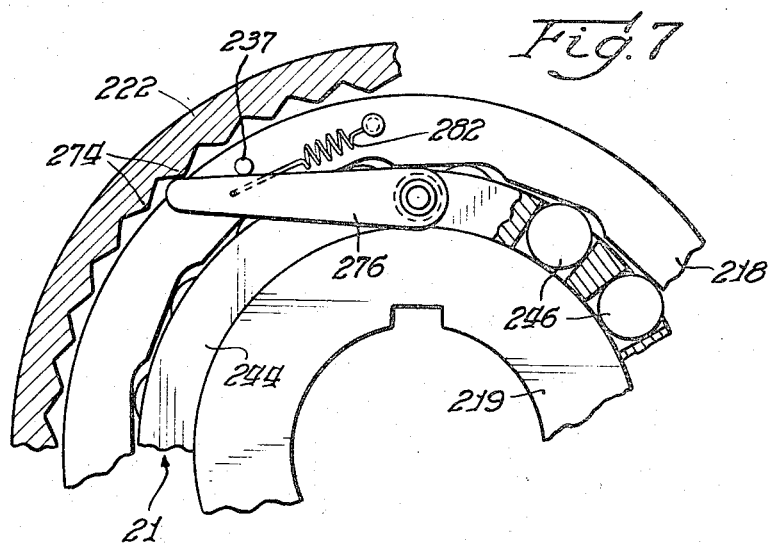
FIGURE 7 is a view of a further embodiment of the clutch in condition for driving in the clockwise direction of rotation.

FIGURE 7 illustrates a somewhat simpler form of overrunning cage shifting device. A pawl 276 is directly connected to cage 244 for shifting rollers 246 with respect to input member 218. Backdriving rotation of output member 219 is effective to engage pawl 276 with the teeth 274 of nonrotatable member 222 preventing backdriving rotation of cage 244 and rollers 246. Input member 218 is enabled to drive output member 219 through rollers 246 while pulling pawl 276 along the nonrotatable member 222 in the clockwise direction. Spring 282 biases pawl 276 against nonrotatable member 222 so that it is conditioned to resist backdriving rotation. In the FIGURE 7 embodiment, the disengaging force is transmitted directly to cage 244 without the intervention of the lever shown in the other embodiments. An abutment 237 may be provided to disengage pawl 276 where it is desired to rotate input member 218 in the counterclockwise direction. Abutment 237 is not required where input member 218 is essentially unidirectional in the clockwise direction.

While the overrunning coupling device has been described with reference to a cage, rollers, and ratchet ring, this has been done for purposes of illustration only, since other forms of shiftable wedging apparatus can be used for interlocking and releasing the clutch members. Also, other forms of overrunning couplings may be used in combination with other kinds of nonrotatable members to achieve shifting of the wedging apparatus with respect to the input member.

While preferred and alternate forms of the invention have been shown and described, it is to be understood that other modifications and variations thereof are included within the spirit of the invention and scope of the following claims.

I claim:
1. A freewheeling clutch (10) including:
  a nonrotatable frame member (22, 222);
  rotatable input (18, 118, 218) and output (19, 219) members;
  and wedging apparatus (21) shiftable between locking and released positions with respect to said input members (18, 118, 218), said wedging apparatus (21) being movable to said locking position responsive to rotation of said input member (18, 118, 218) in a driving direction, and being movable to said released position responsive to overdriving rotation of said output member (19, 219) in said driving direction;
  wherein the improvement comprises,
  an overrunning coupling device (23, 276) connected to said wedging apparatus (21) effective to move said wedging apparatus (21) to said released position responsive to backdriving rotation of said output member (19, 219), said coupling device (23, 276) having a portion thereof (76, 77, 176, 276) biased for one way overrunning engagement with said nonrotatable frame member (22, 222) in said driving direction, said portion (76, 77, 176, 276) opposing rotation of said wedging apparatus (21) in the backdriving direction thereby effecting shifting movement of said wedging apparatus (21) to said released position relative to said input member (18, 118, 218) responsive to the initiation of backdriving rotation of said clutch (10) by said output member (19, 219).

2. A freewheeling clutch (10) according to claim 1, in which said input member (18, 118) is provided with an abutment (36, 37) disposed adjacent said coupling device (23), said abutment (36, 37, 237) camming said coupling device portion (76, 77, 176) out of engagement with said nonrotatable frame member (22) upon relative movement of said wedging apparatus (21) and input member (18, 118) to said released position.

3. A freewheeling clutch (10) according to claim 2, conditioned for automatic selection of either direction of rotation as the driving direction responsive to initial rotation of said input member (18) relative to said wedging apparatus (21), in which said input member (18) is provided with a pair of abutments (36, 37) disposed adjacent said coupling device (23), one of said abutments (36) cooperating with one coupling device portion (77) to cam said portion (77) out of engagement with said nonrotatable frame member (22) responsive to rotation of said input member (18) in the clockwise direction, and the other of said abutments (37) cooperating with said other coupling device portion (76) to cam said other portion (76) out of engagement with said nonrotatable frame member (22) responsive to rotation of said input member (18) in the counterclockwise direction.

4. A freewheeling clutch (10) according to claim 1, in which said nonrotatable frame member (22, 222) is provided with a series of ratchet teeth (74, 274), said overrunning coupling device (23) including pawl members (76, 77, 176, 276) engageable with said ratchet teeth (74, 274).

5. A freewheeling clutch (10) according to claim 1, in which said coupling device (23) includes a lever arm (78, 79) having one end thereof connected to said input member (18, 118) and having a midportion (86, 87) thereof engaged with a portion (54, 57) of said wedging apparatus (21), the other end of said lever arm reacting against a portion of said nonrotatable frame member (22) for multiplication of the shifting effort exerted between said input member (18, 118) and wedging apparatus (21) by said nonrotatable frame member (22) upon backdriving rotation of said clutch (10) by said output member (19).

References Cited

UNITED STATES PATENTS

| 2,796,941 | 6/1957 | Hill. | |
| 3,055,471 | 9/1962 | Warn et al. | 192—45 |
| 3,194,369 | 7/1965 | Witte | 192—45.1 |

BENJAMIN W. WYCHE III, *Primary Examiner.*

L. J. PAYNE, *Assistant Examiner.*